July 24, 1956 L. H. GOOD ET AL 2,756,277
SOUND RECORDING AND REPRODUCING CIRCUIT FOR PICTURES
Filed May 3, 1951
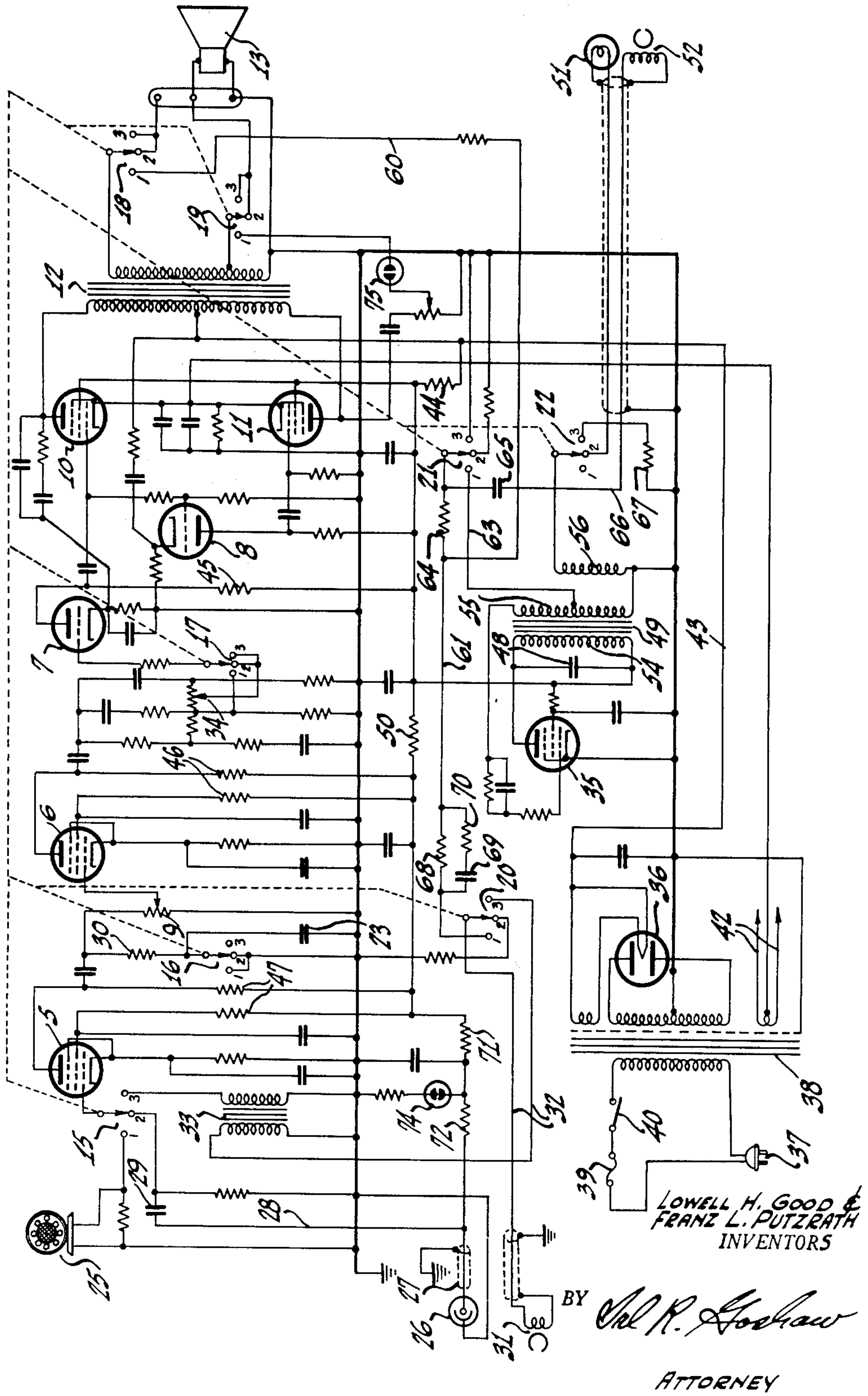
LOWELL H. GOOD &
FRANZ L. PUTZRATH
INVENTORS
BY [signature]
ATTORNEY 2,756,277
Patented July 24, 1956

2,756,277

SOUND RECORDING AND REPRODUCING CIRCUIT FOR PICTURES

Lowell H. Good, Riverton, and Franz L. Putzrath, Pennsauken, N. J., assignors to Radio Corporation of America, a corporation of Delaware Application May 3, 1951, Serial No. 224,294

6 Claims. (Cl. 179—100.2)

This invention relates to signal amplifiers for sound recording and reproducing functions, and particularly to an amplifier and a power supply unit suitable for the triple function of supplying polarizing potentials to an amplifier, energy to an exciter lamp and to a photoelectric cell during photographic sound reproduction, and bias energy to a recording head and erasing energy to an erase head during magnetic sound recording.

With the advent of magnetic recording and reproduction on and from a medium in the form of a magnetic film or tape, and particularly in the form of a strip of magnetic material on photographic film, sound motion pictures can now be provided economically. That is, by utilizing a magnetic strip on a photographic film carrying the pictures, sound may be easily recorded in synchronism during the photographing of the pictures, or narration may be recorded after the pictures have been photographed. By the use of magnetic sound, the cost of providing a sound track for the picture is small compared with the use of a photographic track. Furthermore, by using a magnetic track, corrections may be made by simply erasing and rerecording.

The present invention is directed to a sound recording and reproducing amplifier circuit provided with the usual power supply for polarizing the various tubes and the photoelectric cell. The new circuit includes an oscillator energized from the power supply, the oscillator supplying the necessary bias current to a magnetic recording head, erase current to an erase head in the event that erasing of certain portions of the magnetic track is desired, or to clear the medium, and the excitation current for the exciter lamp when the amplifier is used for photographic reproduction. There is thus provided a compact and economical electrical unit which will serve as a reproducing amplifier from either a photographic sound track or a magnetic sound track, such as disclosed and claimed in Masterson U. S. Patent No. 2,605,364 of July 29, 1952. It is also a recording amplifier for the magnetic sound track, and provides the necessary high frequency bias current therefor, while supplying current for erasing any magnetic signal desired and also current for the exciter lamp during photographic reproduction. The changeover is accomplished by a gang of three-position switches and will be explained hereinafter.

The principal object of the invention, therefore, is to facilitate the recording and reproduction of concomitant sound for motion pictures.

Another object of the invention is to provide an improved signal amplifier and power unit for motion picture projectors and recorders.

A further object of the invention is to provide an improved circuit for supplying an exciter lamp and photoelectric cell for photographic sound reproduction and a magnetic record head and eraser for magnetic sound recording.

A still further object of the invention is to provide an improved switching circuit for interconnecting a high frequency oscillator and amplifier for providing photoelectric cell polarization, exciter lamp current, and bias current for magnetic record and erase heads.

Although the novel features which are believed to be characteristic of this invention will be pointed out with particularity in the appended claims, the manner of its organization and the mode of its operation will be better understood by referring to the following description, read in conjunction with the accompanying drawing, in which the single figure is a schematic drawing of a circuit embodying the invention.

Referring now to the drawing, an amplifier is shown consisting of three single stages, including pentode tubes 5, 6, and triode 7, which are coupled by resistors and capacitors in any well-known manner, a volume control being shown at 9. The output of the last stage 7 is coupled through a phase inverter tube 8 to a push-pull amplifier including tubes 10 and 11, the output of which is fed over a transformer 12 to a loudspeaker 13. It will be noted that a plurality of three-position switches 15, 16, 17, 18, 19, 20, 21, and 22 have been provided, all of which are mechanically interconnected as shown by the dotted lines, so that they operate substantially simultaneously. The three positions of these switches are indicated as 1, 2, and 3. These three switch positions accommodate the circuit for the operation of magnetic recording, optical playback and magnetic playback, respectively.

The input to amplifier tube 5 may be from a microphone 25, or other signal source to be recorded, when the switches are in No. 1 position. (See switch 15.) When the switches are in No. 2 position, the input to tube 5 is from the photoelectric cell 26, over a shielded conductor 28, and condenser 29, the shield being shown at 27. With the switches in No. 3 position, the input to stage 5 is from a record-reproduce head 31 over conductors 32 and transformer 33.

Polarizing potential for the tubes, including an oscillator tube 35, is supplied from a rectifier unit having a full-wave rectifier tube 36, the plug 37 being connected to a standard source of sixty-cycle alternating current for supplying the primary of a shielded core transformer 38 supplied over a fuse 39 when a switch 40 is closed. Conductors 42 go to the heaters of the various tubes, while the high potential is supplied to the tube anodes and shielding grids over conductor 43 when reduced to the desired values by the various series resistors, such as shown at 44, 45, 46, 47, and 50, etc.

The oscillator may supply a current of a frequency above audibility which may be of the order of fifty kilocycles. The high frequency oscillator is controlled by the L—C tuned circuit including the primary 54 of the transformer 49 and the condenser 48.

As mentioned above, the oscillator furnishes bias current to the magnetic head 31 when used as a recording head, current to an exciter lamp 51, and erasing energy to an erasing head 52 according to the position of the switches 15 to 22, inclusive. It is possible for this single unit to provide the multiple functions with simple switching by the use of the triple winding transformer 49, which is of the modified auto-transformer type. The primary 54 has 320 turns wound in two layers and the first secondary 55 has 160 turns in a single layer with a tap at 130 turns. The 160-turn portion of this winding supplies the feedback, while the 30-turn portion supplies the bias current to the record head 31 and the erase head 52. The transformer 49 also has a second secondary 56 of seven turns in a single layer, which supplies the exciter lamp current.

To explain the operation of the unit, it was pointed out above that, when input switch 15 is in No. 1 position, energy from a microphone or a like source will be impressed on tube 5. Also switches 16 and 17 are in interstage connecting positions, and switches 18 and 19 are in a position so that the output of transformer 12 is impressed on the record head over conductors 60 and 61, position 1 of switch 20, and one of conductors 32. Simultaneously with the transmission from the microphone 25 through the amplifier to record head 31, bias current is supplied from the oscillator 35 over conductor 63, position 1 of switch 21, resistor 64, conductor 61, position 1 of switch 20, and one of conductors 32. Thus, in position 1, the unit is a magnetic sound recording amplifier with the proper bias being supplied to the record head by the oscillator 35.

When the switches are in position 2, the unit operates as a photographic reproducer, photoelectric cell 26 being polarized from rectifier tube 36 over conductor 43 and through resistors 44, 50, 71 and 72, the photocell 26 being connected to the input of tube 5 over conductor 28 and condenser 29, as mentioned above. Amplifier tubes 5, 6, and 7 are properly interconnected by switches 16 and 17, while switches 18 and 19 connect the output of transformer 12 to the loudspeaker 13. Switches 20 and 21 do not now function, while switch 22 connects the transformer winding 56 to the exciter lamp 51. Thus, the system, when the switches are in position 2, serves as a normal standard signal amplifier for photographic sound tracks.

For magnetic erasing, the oscillator 35 will supply current to the erase head 52 over position 1 of switch 21, condenser 65, and conductor 66. In this manner, the erase head may function simultaneously with the record head, but ahead of it on the record medium. For magnetic reproduction, the switches are thrown to position 3, which connects the head 31 through switch 20 to transformer 33. The single stage amplifier tubes will again be interconnected by switches 16 and 17, while switches 18 and 19 will connect the loudspeaker 13 to output transformer 12. In switch position 3, the secondary 56 is furnished with a separate load, such as by a resistor 67. This load does not functionally affect the magnetic playback operation of the circuit, and it acts to keep the operating conditions of the oscillator 35 within practical limits.

When the unit is employed as a magnetic-record playback amplifier, the lower audio frequencies must be augmented. Therefore, in position No. 3 of the switch 16, a condenser 23 is connected in series with a load resistor 30. With this arrangement, the input to the second amplification stage becomes frequency responsive, with the accent on the lower frequency signals. Since this accentuation is not desired when the circuit is used as a recording amplifier or an optic playback amplifier, the condenser 23 is short-circuited when the switch 16 is in either position No. 1 or 2.

Similarly, switch 17, when turned to position No. 1, bypasses the tone control element 34 since it has been found preferable to eliminate such a control during recording. However, when the switch 17 is turned to either of the playback positions (i. e. position No. 2 and 3), the tone control element 34 is connected into the circuit.

When the switches are thrown to position 1 for magnetic recording, it will be noted that the audio on conductor 60 and the oscillator biasing current from secondary 55 are fed to the record head 31 over a compensation network composed of resistor 64 of 22 ohms and a resistor 68 of 3900 ohms shunted by a condenser 69 of .025 mf. and a resistor 70 of 150 ohms. (The values of these resistors are merely representative.) In this manner, the proper combination of the audio signal and the biasing current is provided. The usual voltage regulator tubes 74 and 75 are provided as well as other standard circuits elements, such as by-pass and filter condensers.

The above unit, therefore, is built into a particularly compact assembly and serves the above described three multiple functions. The capacity-resistance coupling between the single stage amplifiers and the push-pull stage provides high quality amplification of the signal for both recording and reproduction. The unit functions for both photographic and magnetic sound reproduction and magnetic sound recording and erasing, thus providing a high quality economical sound recording and reproducing circuit.

We claim:

1. A signal transmission circuit comprising a plural stage signal amplifier, an oscillator for generating a current above audibility, a speaker, a light detector, an exciter lamp, a magnetic record-reproduce head, a magnetic erase head, means for connecting and disconnecting said magnetic head to and from the input of said amplifier, means for connecting and disconnecting said light detector to and from the input of said amplifier, means for connecting and disconnecting said amplifier to and from said speaker, means for connecting and disconnecting said oscillator to and from said magnetic head, means for connecting and disconnecting said exciter lamp to and from said oscillator, and means for connecting and disconnecting said magnetic head to and from said oscillator, all of said means including a plurality of mechanically interconnected switches between said elements, one position of said switches connecting the output of said amplifier to said magnetic record-reproduce head and said oscillator to said record and erase heads for erasing a magnetic film and recording the output of said amplifier on said film, another position of said switches connecting said oscillator to said exciter lamp and the output of said amplifier to said speaker for supplying energy to said lamp for reproducing a photographic film through said amplifier and said speaker, and another position of said switches connecting the input of said amplifier to said record-reproduce head and the output of said amplifier to said speaker for reproducing a magnetic film through said amplifier and said speaker, said oscillator including a transformer having three secondary windings, one secondary winding supplying feedback for said oscillator, a second secondary winding supplying magnetic head bias and erase energy, and a third secondary winding supplying energy for said exciter lamp.

2. An amplifier for magnetic sound recording and reproduction and photographic reproduction, comprising multiple amplifier stages, a switch in the input circuit of said amplifier, a power supply, a high frequency oscillator, a magnetic record-reproduce head, a magnetic erase head, an exciter lamp, a switch between the output of said amplifier and said magnetic record-reproduce head, a switch between said oscillator and said record-reproduce head, and a switch between said oscillator and said exciter lamp, means for connecting and disconnecting said magnetic head to and from the input of said amplifier through said first-mentioned switch, means for connecting and disconnecting the output of said amplifier to and from said magnetic head through said second mentioned switch, means for connecting and disconnecting said oscillator to and from said magnetic head through said third mentioned switch, and means for connecting and disconnecting said oscillator to and from said exciter lamp through said last mentioned switch, all of said switches having multiple positions, one position connecting said oscillator to said record-reproduce head, the output of said amplifier to said record-reproduce head, and said erase head to said oscillator for erasing a magnetic film and recording the output of said amplifier on said film, another position of said switches connecting said record-reproduce head to the input of said amplifier, and a third position of said switches connecting said oscillator to said exciter lamp, said oscillator including a transformer having three secondary windings, means for connecting one secondary winding of said transformer to said magnetic head for supplying high frequency bias to said head, means for feeding back the energy in another secondary winding to said oscillator, and means for connecting a third secondary winding of said transformer to said exciter lamp, a load being substituted for said exciter lamp by said last mentioned switch when said first mentioned switch connects said magnetic head to the input of said amplifier.

3. An amplifier in accordance with claim 2, in which a photocell and a source of signals are provided, and means are connected to said switch in the input of said amplifier for connecting said amplifier to said record-reproduce head, to said photocell, and said source of signals, and means are provided to connect said oscillator to said erase head when said oscillator is connected to said record-reproduce head.

4. An amplifier in accordance with claim 2, in which switches are provided between said multiple stages to vary the coupling in accordance with the type of input to said amplifier.

5. A triple function amplifier for reproducing magnetic and photographic sound records and recording magnetic sound records, comprising a multi-stage amplifier, an oscillator, a photocell, a power supply for providing energizing potentials and currents to said amplifier stages, said oscillator, and said photocell, a record-reproduce head, an exciter lamp, a tone control element connectable between stages of said amplifier, means for connecting and disconnecting said magnetic head to and from the input of said amplifier, means for connecting and disconnecting said photocell to and from the input of said amplifier, means for connecting and disconnecting the output of said amplifier to and from said magnetic head, means for connecting and disconnecting said oscillator to and from said magnetic head, means for connecting and disconnecting said exciter lamp to and from said oscillator, and means for connecting and disconnecting said tone control to and from said amplifier, all of said means including switching means for simultaneously interconnecting the output of said amplifier with said record-reproduce head and said oscillator with said record-reproduce head at one time, and said oscillator to said exciter lamp and said photocell to said amplifier at another time, said oscillator including a transformer having a primary and three secondary windings, said primary and one of said secondaries being a portion of said oscillator, another of said secondaries being connected to said record-reproduce head at said one time, and the third of said secondaries being connected to said exciter lamp at said other time.

6. A triple function amplifier in accordance with claim 5, in which a condenser is provided and in which said switching means includes means for connecting said record-reproduce head to the input of said amplifier and said condenser between two stages of said amplifier, and said other of said secondaries to an artificial load.

References Cited in the file of this patent

UNITED STATES PATENTS

| | | |
|---|---|---|
| 2,440,537 | Belar | Apr. 27, 1948 |
| 2,564,312 | Roosmann | Aug. 14, 1951 |
| 2,600,046 | Bobb | June 10, 1952 |

OTHER REFERENCES

S. M. P. E., November 1948, pages 481–488.